United States Patent [19]
Gaines et al.

[11] B 3,924,968
[45] Dec. 9, 1975

[54] RADIAL COMPRESSOR WITH MUFFLED GAS CHAMBERS AND SHORT STABLE PISTON SKIRTS AND METHOD OF ASSEMBLING SAME

[75] Inventors: Marvin E. Gaines; Robert L. Swadner, both of Dayton, Ohio

[73] Assignee: General Motors Corporation, Detroit, Mich.

[22] Filed: Nov. 19, 1973

[21] Appl. No.: 416,933

[44] Published under the Trial Voluntary Protest Program on January 28, 1975 as document no. B 416,933.

Related U.S. Application Data
[63] Continuation-in-part of Ser. No. 275,553, July 27, 1972, abandoned.

[52] U.S. Cl.............. 417/53; 29/156.4 R; 92/172; 417/273
[51] Int. Cl.²...................... F04B 1/04; B23P 15/00
[58] Field of Search ........ 92/172, 255, 155; 29/525, 29/156.4 R; 74/50, 61, 89.1; 417/273, 53; 91/494, 495

[56] References Cited
UNITED STATES PATENTS

| | | | |
|---|---|---|---|
| 1,383,657 | 7/1921 | Noguera | 417/273 |
| 1,687,425 | 10/1928 | Briggs | 74/50 |
| 2,598,975 | 6/1952 | Coulter | 29/525 |
| 2,710,137 | 6/1955 | Arnovil | 92/172 |
| 2,818,816 | 1/1958 | Christenson | 417/273 |
| 3,133,450 | 5/1964 | Riley et al. | 74/50 |
| 3,168,301 | 2/1965 | Allinquant | 92/155 |
| 3,174,436 | 3/1965 | Wanner | 417/273 |
| 3,212,411 | 10/1965 | Storms | 92/248 |
| 3,358,914 | 12/1967 | MacMillan | 92/155 |

FOREIGN PATENTS OR APPLICATIONS
367,790 2/1939 Italy.................................. 417/273

*Primary Examiner*—William L. Freeh
*Assistant Examiner*—Gregory Paul LaPointe
*Attorney, Agent, or Firm*—Frederick M. Ritchie

[57] ABSTRACT

A compact high capacity radial refrigerant compressor suitable for use in automotive refrigeration systems includes a cast cylinder housing having cross bores and sound muffling intake and discharge chambers formed therein. The cylinder housing is also cast to form strategically located strengthening webs while also providing suitable areas for securing both a cylinder head to the housing and the entire unit within an operational environment such as within a vehicle engine compartment. In preferred form, modified cross operating yokes, actuated by a common slider block through a shaft eccentric, have press-fitted pistons rigidly attached forming stable oppositely extending piston assemblies. An annular groove on each piston skirt receives a relatively wide annular Teflon seal which is effective to reduce the necessary piston skirt length while yet providing a stable sealed engagement with the cylinder. The long bearing length of the seal, relative to the piston length, reduces wear by avoiding metal-to-metal contact and reduces lubrication requirements as the seal remains in constant contact with the cylinder walls. Each piston skirt has vent holes beneath its Teflon seal. These vent holes provide a bypass, from the discharge side of the piston to the suction side, to prevent leakage gases from tending to blow the seal out of its groove.

17 Claims, 15 Drawing Figures

RADIAL COMPRESSOR WITH MUFFLED GAS CHAMBERS AND SHORT STABLE PISTON SKIRTS AND METHOD OF ASSEMBLING SAME

This is a continuation-in-part of our copending application Ser. No. 275,553, filed July 27, 1972 now abandoned This invention relates to radial compressors and, more particularly, to a compact automotive refrigerant compressor of the type including a rigid cylinder housing having muffled intake and exhaust gas chambers and further having short skirted, but well-sealed, pistons reciprocating within cross bores in the cylinder housing.

Limited space within vehicle engine compartments necessarily requires use of accessory components occupying a minimum of space. One component accomplishing this feature is a radial refrigerant compressor used in association with a vehicle air conditioning system. The radially extending pistons occupy a minimum axial length within the compartment. Accordingly, it is a purpose of this invention to provide an improved radial compressor having desirable qualities in addition to those presently known in the art.

A general object of this invention is the provision of sound muffling intake and exhaust chambers along with strengthening and mounting webs in a cast radial compressor cylinder housing.

Another object of this invention is the provision of a press-fit connection between a slider block actuated yoke and oppositely extending pistons resulting in a short but stable connection facilitating reciprocating piston motion with no "connecting rods."

Another object of this invention is the provision of an improved method of assembling a radial compressor without screws comprising the steps of inserting a unitized drive shaft assembly into the intake chamber of a radially bored and counterbored cylinder housing, press-fitting unitized piston-intake valve assemblies through the radial bores into stable connections with said drive shaft assembly, and snap-fastening unitized discharge valve assemblies into seated relationship in said counterbores.

Another object is the provision of an improved method of assembling a radial four cylinder compressor to eliminate screws from moving aluminum parts including the steps of inserting a unitized drive shaft assembly through an open end of a radially bored one-piece casting to a journaled position in a closed end of the casting and then press-fitting a pair of aluminum pistons into associated actuating aluminum yokes in the assembly through cylinder bores 90° apart in the casting.

A further object of this invention is the provision of a relatively short skirted piston containing a relatively wide Teflon sealing ring providing a desired seal between the piston and walls of the cylinder housing as a result of the stable press-fit connection between the relatively short piston and its associated actuating yoke.

A further object of this invention is the provision in a compact radial compressor cylinder housing of a relatively short skirted piston containing a sufficiently wide Teflon sealing ring in a groove of the piston skirt to accomplish a fluid tight seal while providing substantial area of engagement preventing metal-to-metal contact between the piston skirt and cylinder bore wall as a result of the stable press-fit connection between the relatively short piston and its associated actuating yoke and slider block.

Another object of this invention within the provision of the last object is a vent port through the piston skirt beneath the sealing ring to bypass leakage gases from the discharge side of the piston to the suction side thereof to prevent said gases from distending said sealing ring out of its groove, thereby to prevent a distended portion of the sealing ring which is exposed in the suction chamber from being sheared by the inner edge of the cylinder bore wall when the exposed portion reenters the cylinder bore in response to actuation of said piston back into said cylinder bore.

A still further object of this invention is the provision of a wide Teflon sealing ring in a short skirted piston reducing lubrication requirements between the piston and the walls of the cylinder housing due to the seal being continuously engaged with the walls and providing a relatively wide bearing surface.

Another object of this invention within the provision of the last object is an improved method of assembling a radial compressor wherein the wide sealing ring in a short skirted piston facilitates the alignment of the piston stem as it is pushed to a press-fit connection with its associated actuating yoke.

Another object in the radial compressor of this invention is the provision of an improved shaft assembly riveted together for insertion as a unit into the compressor and including steel bearing retainers keyed to a steel slider block to prevent the retainers from digging into and thus gouging guide shoulders on their associated aluminum yoke.

A more complete understanding of the present invention may be had from the following detailed description which should be taken in conjunction with the drawings wherein preferred embodiments of the present invention are clearly shown.

Figure 1:
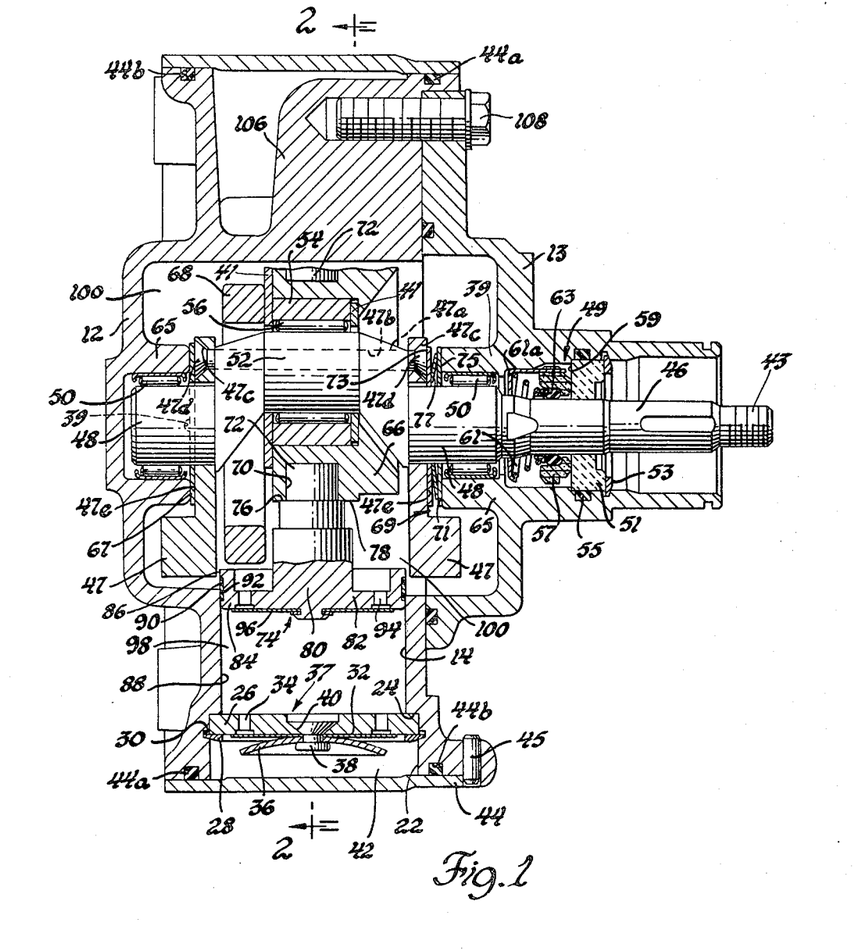
FIG. 1 is a view in vertical section taken on an irregular plane as line 1—1 of FIG. 2 through a radial compressor incorporating features of the present invention.
Figure 2:
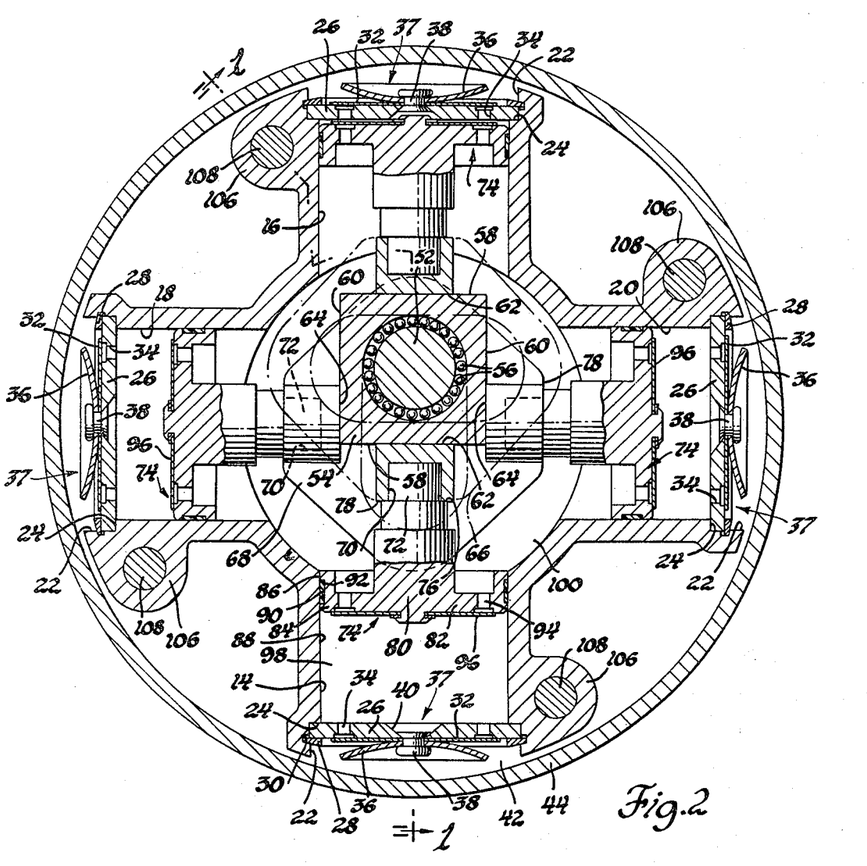
FIG. 2 is a vertical cross-sectional view taken on line 2—2 of FIG. 1.
Figures 5, 6, 7:
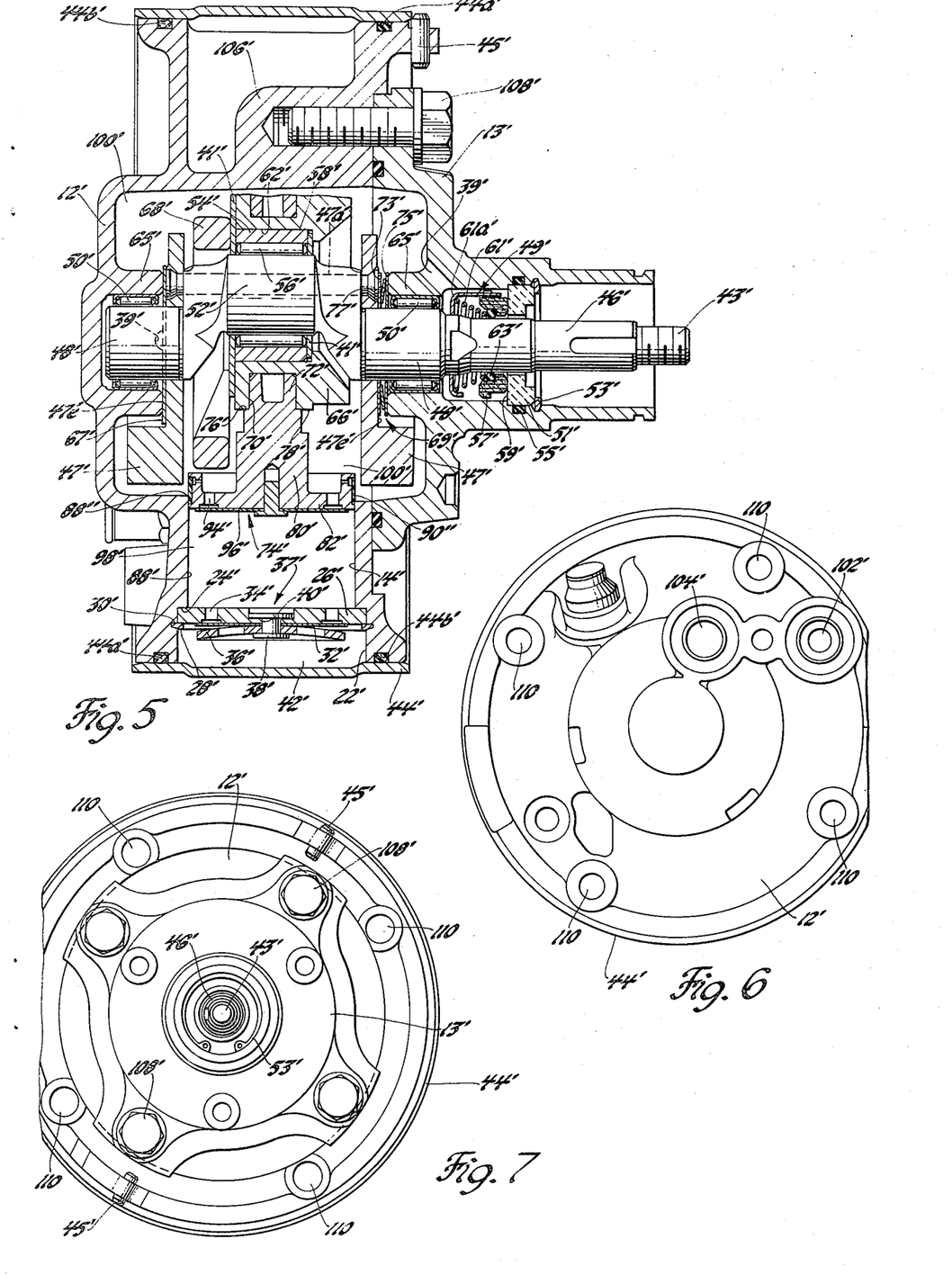
FIG. 5 is a view similar to FIG. 1 showing another embodiment of this invention.
FIG. 6 is a partial plan view of the closed rear wall of the compressor of FIG. 5.
FIG. 7 is a partial plan view of the open front wall of the compressor of FIG. 5 closed by a cylinder head.

Referring now to the drawings, radial compressors having features of the subject invention are shown in FIGS. 1 and 5. Counterpart elements in the compressor of FIG. 5 use the same reference numbers used to describe the compressor of FIG. 1 but with the numbers primed. Basically, the subject invention is a modification of the compressor assembly described in copending application SER. No. 254,511, filed May 18, 1972, now U.S. Pat. 3,784,331 granted Jan. 8, 1974, and assigned to the assignee of this invention, the disclosure of that application being incorporated by reference into the description of this invention. The subject compressor includes a rigid cast cylinder housing 12 closed by a cylinder head 13, having oppositely extending cross bores 14 and 16 on a first axis of the housing and a second pair of cross bores 18 and 20 on another axis of the housing normal to the first axis as best shown in FIG. 2. Each of the cross bores 14, 16, 18 and 20 terminate in a diametrically enlarged bore or counterbore 22 connecting with the aforementioned bores at a flange or shoulder 24. A valve plate 26 is positioned against the flange 24 and is retained by a snap ring 28 received in a groove 30 in the enlarged bore 22. An annular discharge reed plate 32 controls flow through a series of circumferentially spaced discharge apertures 34 and is retained by a plate 36, the valve plate assembly 37 or discharge valve means being secured together by a rivet 38 in a central aperture 40 in the valve plate 26. The reed plate 32 controls flow of pressurized gas into a discharge chamber 42. The cylinder housing is circular in form and is enclosed on its outer periphery by a cylindrical band 44 enclosing the discharge chamber 42, the band 44 being retained by a plurality of pins 45 in housing 12. Annular seals 44a are received in housing grooves 44b thereby providing a fluid tight seal for discharge chamber 42.

Figure 8:
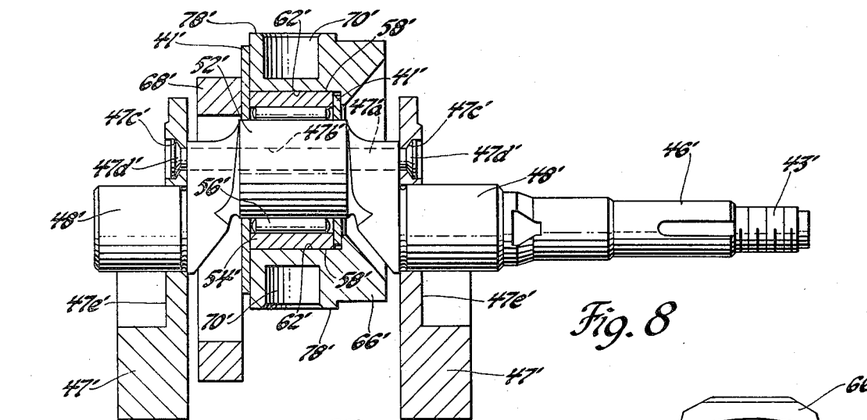
FIG. 8 is a side elevational view, partly in section, of a drive shaft assembly for reciprocatingly actuating pistons in the compressor of FIG. 5.
Figure 9:
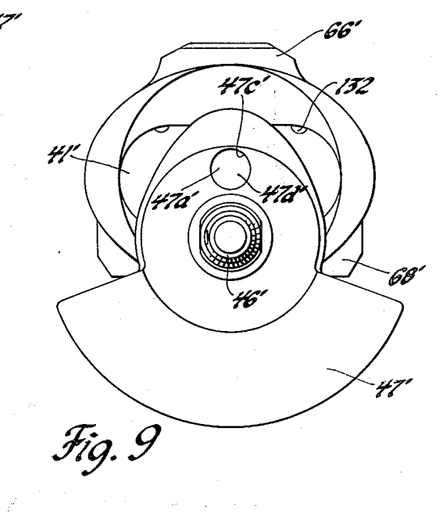
FIG. 9 is an end plan view of the shaft assembly of FIG. 8.
Figure 10:
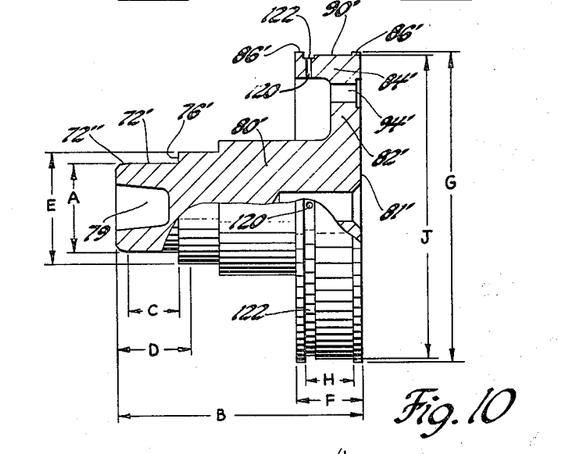
FIG. 10 is side elevation, partly in section, of a piston adapted for press-fit and sealing ring retention in the compressor of FIG. 5.
Figures 11, 12, 13:
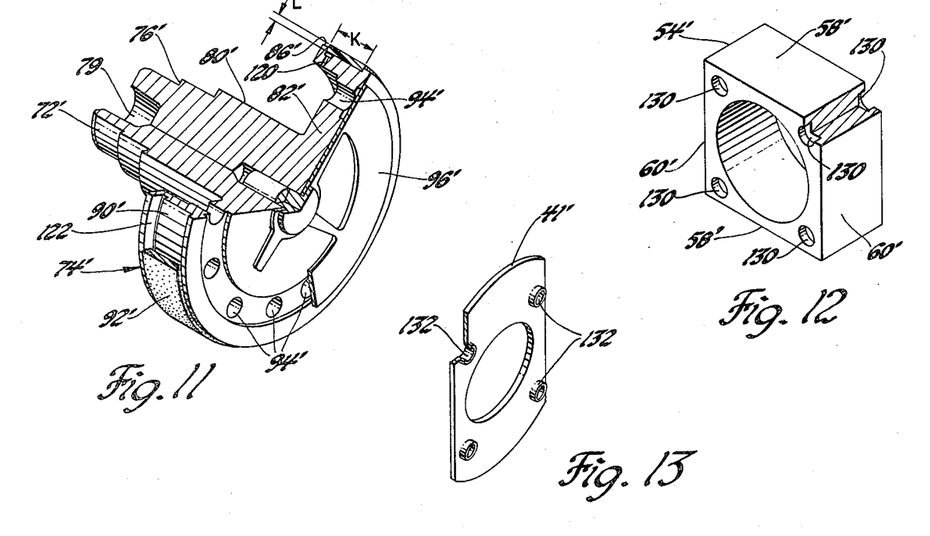
FIG. 11 is a prospective view with parts broken away of a piston assembly including the piston of FIG. 10.
FIG. 12 is a prospective view with part broken away of the improved slider block in the compressor of FIG. 5.
FIG. 13 is a prospective view with part broken away of an improved bearing retainer in the compressor of FIG. 5.

The compressor is driven from the threaded end 43 of a shaft 46 which includes spaced enlarged bearing portions 48 supported for rotation in housing 12 by main bearing assemblies 50 in communication with a central suction space or inlet chamber 100 via lubricant bleed passageways 39. The shaft 46 also includes an eccentric portion 52 having a slider block 54 mounted thereon for relative rotation between the shaft and the block via a plurality of separate elongated needle bearings 56 which are retained against axial movement relative to the eccentric portion 52 by needle retainers 41. As best illustrated in FIGS. 2, 8 and 12, the slider block 54 includes surfaces 58 and 60 which engage surfaces 62 and 64 of yoke assemblies 66 and 68, the yoke assembly 66 being shown in phantom in FIG. 2.

The shaft 46 also supports a pair of counterweights 47 and engages a fluid seal assembly 49 as illustrated in FIGS. 1 and 5. The seal assembly includes a ceramic ring 51 retained by a snap ring 53, the ceramic ring being sealed at its outer periphery by an O-ring 55. A carbon or like material sealing ring 57 is biased into engagement with face 59 of the ceramic ring 51 by a spring 61 positioned in a sheet metal cup 61a. An O-ring 63 seals the inner periphery of the carbon sealing ring 57 with the outer surface of shaft 46.

The cylindrical housing 12 and cylinder head 13 each include inwardly extending annular flanges 65 which receive the previously described shaft portions 48 and their associated bearing assemblies 50. The counterweights 47 are pivotally mounted to shaft eccentric 52 by a rivet 47a extending through an aperture 47b in the eccentric. The counterweights contain tapered counterbores 47c which accommodate flared ends 47d of the rivets. A thrust washer 67 is provided between annular flange 65 of housing 12 and surface 47e of its associated counterweight 47. A thrust bearing assembly 69 is positioned between end 71 of the annular flange 65, associated with the cylinder head 13, and surface 47e of its associated counterweight 47. The thrust bearing assembly 69 comprises a pair of washers 73 and 75 which are biased axially apart by a Belleville spring 77 so that the eccentric 52 of shaft 46 is centrally positioned relative to the cross bores 14, 16, 18, and 20.

Figure 1A:
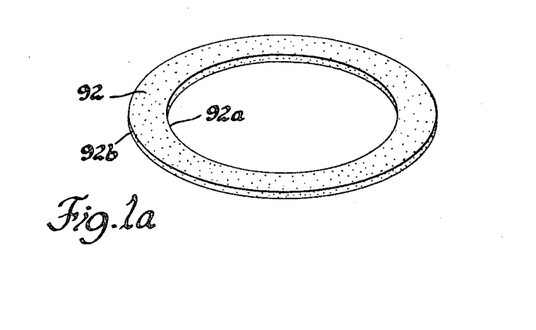
FIG. 1a is a perspective view showing a piston sealing ring of the subject invention.

The yoke assemblies 66 and 68 are machined to include cavities 70 each receiving a reduced stem portion 72 of piston assemblies 74. The stem portion 72 is press-fitted within the cavity 70 to form a rigid connection between the respective yokes and the piston assemblies. The piston assembly 74 can be formed to include a shoulder 76 engaging outer surface 78 of the yoke assemblies to aid in the stability of the connection. The piston assemblies 74 each comprise a diametrically enlarged central portion 80 which terminates in an integral cup portion 82 having a relatively short skirt portion 84 providing an outer surface 86 engaging cylinder wall 88 of the cylindrical housing 12. The outer surface 86 of the piston assembly 74 contains a relatively wide groove 90 receiving, in a preferred embodiment, a matched Teflon sealing ring 92 providing a fluid tight seal between outer surface 86 of the piston and the cylinder wall 88. The Teflon ring 92 is initially in the form of a flat washer as shown in FIG. 1a, its inner opening 92a being sized to allow the washer 92 to slide upon the skirt 84 and be received within groove 90. The sealing ring 92 is then folded into the groove so that its outer peripheral surface 92b is biased into engagement with cylinder wall 88 when the piston assembly 74 is placed within its respective cross bore. The piston assembly 74, with the ring 92 folded into groove 90, can be forced through a sizing fixture sizing the ring to a specific size so as to provide a predetermined desired sealing engagement with the cylinder wall 88 of the cross bores. The piston assembly also includes circumferentially spaced inlet apertures 94 which are normally closed by a suction reed plate 96 or suction valve means which is operative to regulate flow of gas into the compression chamber 98 from an inlet chamber 100.

Figure 3:
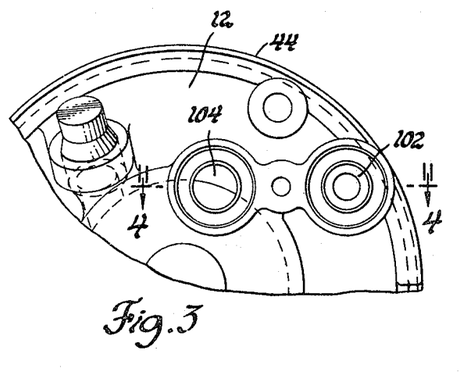
FIG. 3 is a partial end plan view of FIG. 1.
Figure 4:
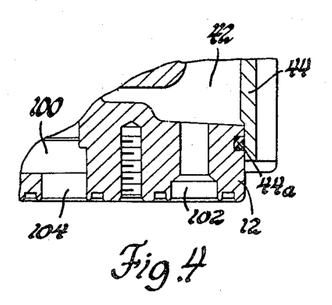
FIG. 4 is a fragmentary cross-sectional view taken on line 4—4 of FIG. 3.

In operation rotation of shaft 46 results in reciprocating movement of the slider block 54 along two axes which are normal to one another so as to provide reciprocation of the piston assemblies 74 within their respective cross bores 14, 16, 18, and 20. Movement of one of the piston assemblies 74 within its respective cross bore toward the center of the cylindrical housing 12 causes the gas to open the suction reed plate 96 forcing refrigerant from inlet chamber 100 through apertures 94 into compression chamber 98 while at the other end of the yoke assembly, the piston assembly being extended compresses refrigerant in chamber 98 opening discharge reed plate 32 so that the pressurized refrigerant flows through apertures 34 into discharge chamber 42 for supply to the system through port 102 shown in FIGS. 3 and 6 respectively. An inlet port 104 is provided for entrance of refrigerant into inlet chamber 100 from the vehicle air conditioning system for compression thereof and recirculation to the system for expansion and continuous recycling.

The press-fit connection between stem 72 of the piston assembly 74, which is received within cavity 70 in each of the yoke assemblies, provides a stable connection between the yokes and the pistons. This stable connection allows use of the relatively short skirt portion 84 of the piston assembly 74. Also, provision of the relatively wide groove 90 in the outer surface 86 of the short skirt 84 and the placement of the Teflon sealing ring 92 therein results in a relatively wide bearing surface between the piston skirt and the cylinder walls 88. This accomplishes a fluid tight seal while providing substantial area of engagement preventing metal-to-metal contact between the piston skirt 84 and the cylinder walls 88. Consequently, the piston can be substantially reduced in size and can be readily assembled into the yoke assembly by virtue of the press-fit connection.

The cylinder housing 12 is molded to include four strategically diametrically located web portions 106, one of which is shown in FIGS. 1 and 5. These web portions perform a dual function in that they provide areas for the fastening of the cylinder head 13 by a plurality of machine bolts 108 while also providing reinforcement of the cylinder housing assembly 12. In a preferred embodiment web portions 110, in addition to reinforcing the cylinder housing, are drilled and tapped to provide areas for securing the entire compressor assembly in an operational environment such as an automobile engine compartment. It is also significant that the cylinder housing 12 is molded to include a relatively large intake chamber 100 as well as a relatively large discharge chamber 42, both of which act to muffle the sound energies present in the refrigerant as it flows through the unit. Use of these large chambers contributes significantly to quieter vehicle operation.

A preferred embodiment of the radial four cylinder compressor is shown in FIGS. 5 – 14 inclusive and includes the details of a particular press-fit suitable for connecting piston assemblies to yokes in the compressors of this invention. The basic compressor mechanism is a modified scotch yoke with four cylinder bores 14', 16', 18', and 20' located radially in the same plane. A drive shaft assembly, FIG. 8, includes a hot forged crankshaft 46', separate bearing needles 56', hardened steel neelde retainers 41', steel slider block 54', die cast aluminum yokes 66', 68' and sintered iron counterbalance weights 47' all held together by a stainless steel hot rivet 47a '. By an assembly method described hereinafter, opposed piston assemblies 74' are pressed into their respective yokes. The yoke ends beneath each press-fit piston ride upon slider block 54' which is located on shaft eccentric 52'. Rotation of shaft 46' provides reciprocating piston motion with no "connecting rods." The compressor mechanism is completely balanced with counterweights. Caged needle bearings 50' are used for the shaft journals and separate needles 56' for the shaft eccentric. Pistons and yokes, along with the main cylinder housing and front cylinder head, are made from aluminum to provide light weight. The outer shell 44' is a simple steel band which encloses a large annular discharge muffler space 42'.

A suitable press-fit effecting a stable connection in the preferred embodiment avoids galling or cracking the yoke and may be accomplished by providing predetermined interference dimensions and configurations for each yoke cavity or socket 70' and its respective piston stem portion 72'. More particularly, yoke socket 70' may have an inside diameter between 0.4985 inch and 0.4995 inch while the piston stem portion may have a finished outside diameter A between 0.5015 inch and 0.5020 inch. Such press-fit is accomplished by providing a lead-in portion 72'' having a 10° bevel or chamfer and some form of lubricant. When piston and yoke are pressed together, the resultant interference of such dimensions provides a stable connection therebetween. A hollow 79 in piston stem 72' provides a reservoir or compression chamber to store air trapped between piston stem and yoke socket during press-fitting. Proper alignment before press-fitting is also important in achieving the desired sealing and bearing characteristics between the piston ring and cylinder bore. For this purpose, the surface of piston stem 72' should have a squareness of 0.0003 inch with respect to the face surface 81' of the piston.

In accordance with copending application Ser. No. 416932 filed concurrently herewith and assigned to the same assignee, an improved press-fit may be had by tinning the pistons. In general, the pistons are immersed in a sodium stannate chemical immersion plating solution for a sufficient period to form a tin plate thickness of roughly 0.00005 inch. The tin plating provides the lubricant for a press-fit of unquestionable integrity during compressor operation by facilitating the insertion of piston into the yoke without galling.

A suitable piston configuration accomplishing the foregoing stable connection follows. The length B of the piston is between 1.408 inch and 1.413 inch. A portion of the stem 72' maintains the aforesaid outside diameter A for a length C of 0.320 inch. The end of the stem portion 72' is beveled or chamfered first at 45° for initial alignment clearance and then at 10° to provide a lead-in portion 72'' facilitating smooth relative movement of piston and yoke to press-fit. The area D is critical in strength and should be free of injurious porosity throughout the stem portion 72' and into the shoulder area 76'. The diameter E of shoulder 76' is 0.625 inch.

The relatively short skirt portion 84' of the piston has a length F of 0.380 inch at a diameter G of between 1.775 inch and 1.780 inch. The relatively wide groove 90' has a length H of between 0.260 inch and 0.265 inch and a depth formed by a reduced diameter J of between 1.734 inch and 1.735 inch. A piston seal ring 92' suitably providing bearing, sealing and lubrication surfaces in piston assembly 74' may be formed of Teflon or other equivalent material and have a length dimension K (FIG. 11) of between 0.242 inch and 0.246 inch and a thickness L of between 0.028 inch and 0.031 inch.

In accordance with another aspect of this invention, piston assembly 74' provides a vented skirt on the piston beneath the sealing ring 92'. One means of maximizing the compactness of the radial compressor of this invention is to expose a portion of the piston skirt in the suction cavity 100, 100' when the piston is in its radially innermost position. Where sealing ring 90, 90' is substantially as wide as the skirt, this means that a portion of the ring, too, is exposed. Occasionally, there is a tendency for gas leakages to occur from the high pressure side of the piston assembly 74, 74' (compression chamber 98, 98') to the low pressure side thereof (suction chamber 100, 100'). When this occurs, such leakage gases tend to get under the sealing ring, distending same out of its groove 90, 90' on the piston skirt. If this occurs when the piston assembly is in its innermost position with a seal portion 90" exposed (FIG. 5) and distended, the next compression stroke of the piston assembly may shear off the distended portion of the seal on the inner edge 88" of the cylinder bore wall.

This can be prevented in accordance with this invention by relieving leakage gas pressures beneath the sealing ring. Four vent holes 120 are equally spaced around the piston skirt and joined beneath the seal by an annular groove 122. Each hole 120 is between 0.030 inch and 0.035 inch in diameter; groove 122 is between 0.050 inch and 0.055 inch wide and between 0.010 inch and 0.015 inch deep. Any leakage gases from high side to low side are collected by groove 122 and by-passed to the suction chamber through holes 120. The tendency of the sealing ring to distend out of its groove 90' on the piston skirt is eliminated; the sealing ring hugs the skirt; and shearing of the sealing ring when the compressor operates is obviated.

Yet another improvement in the compressor of this invention is the keyed relationship between bearing retainers 41' and slider block 54'. A problem arises because the yokes 66', 68' are aluminum and the bearing retainers are hardened steel. During high speed compressor operation, the relatively reciprocating retainer may tend to dig into flanking shoulders on the yoke. This is prevented in the shaft assembly of this invention by forming four sockets 130 on each side of the slider block and four extrusions 132 on each bearing retainer 41'. The extrusions key the retainers to the slider block and prevent excursions of the retainers beyond their predetermined path of reciprocation.

Figure 14:
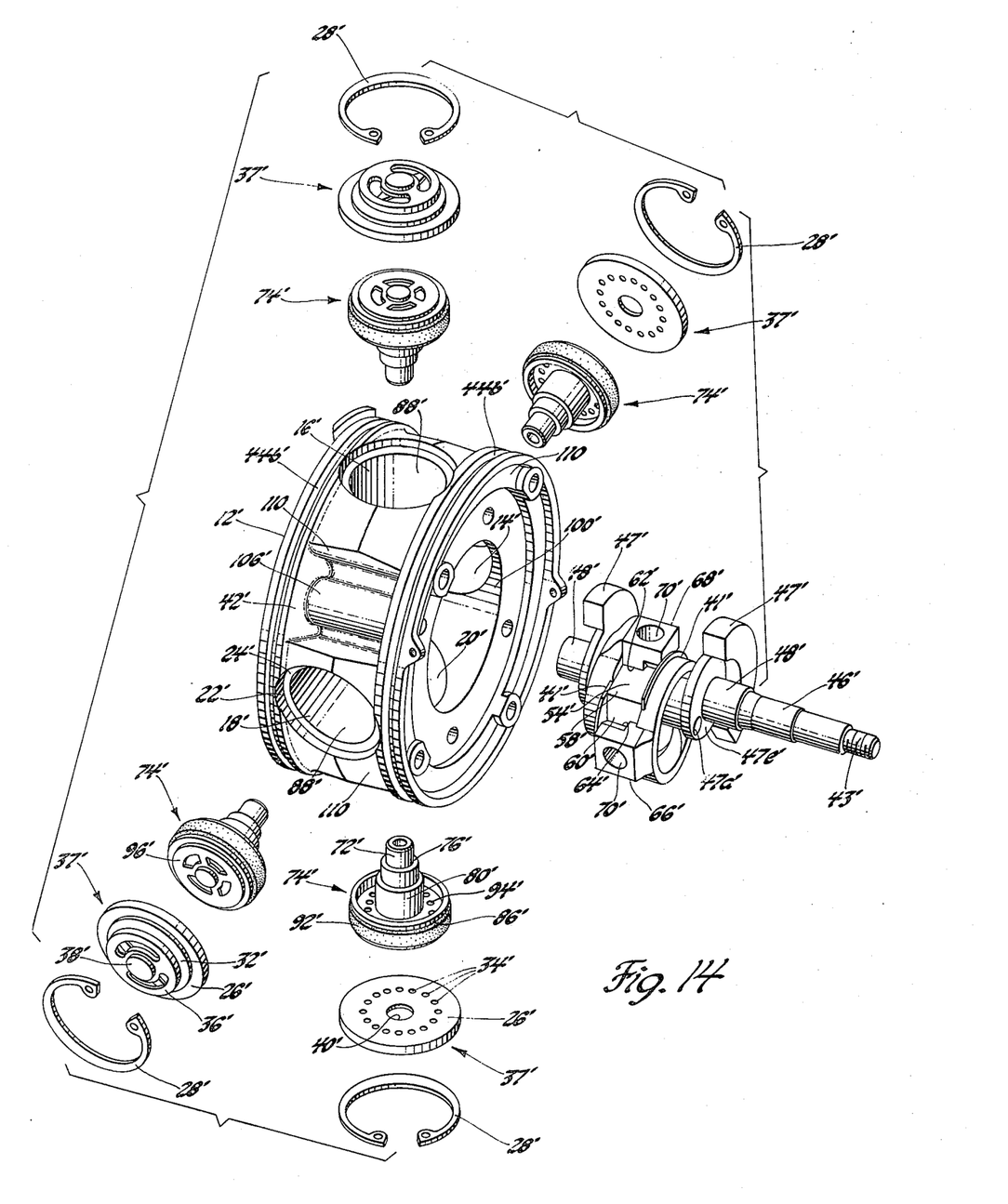
FIG. 14 is an exploded view of a radial compressor incorporating features of the compressors of FIGS. 1 and 5.

In accordance with the novel features of this invention and with reference to FIGS. 5 and 14, the radial four cylinder compressor may be assembled as follows:

1. The shaft assembly (FIG. 8) plus thrust washer 67' assembled thereto is positioned with threaded end 43' down.
2. The cylinder body 12', with open end down, is then assembled onto item No. 1.
3. Dummy plugs are inserted through cylinder bores 14', 16' (90° apart) into the two yoke sockets 70' which are aligned with said bores 14', 16', thus aligning the other two yoke sockets 70' with cylinder bores 18', 20'; two piston assemblies 74' are inserted into cylinder bores 18', 20' (90° apart) and press-fit into said other two yoke sockets 70'.
4. The remaining two piston assemblies 74' are then inserted into cylinder bores 14', 16' and press-fit into the yoke sockets 70' first occupied by the dummy plugs.
5. The cylinder body assembly is now inverted, open end up, and receives valve plate assemblies 37', retaining rings 28', tanged together thrust washers 73', 75' with Belleville washer 77' sandwiched therebetween, O-rings 44a', shell 44', front head 13', shaft seal 49', and retaining ring 53'.

While we have shown and described specific embodiments of the present invention, it will, of course, be understood that various modifications and alternative constructions may be made without departing from the true scope of this invention. In particular it is possible, for example, that the piston assemblies 74 could be made to include a cavity having an extension of the yokes press-fitted therein to provide the stable connection between the yokes and the piston assemblies. For this reason we intend, therefore, by the appended claims to cover all such arrangements falling within the true spirit and scope of these claims.

What is claimed is:

1. A radial compressor of the type including a cast cylinder housing having cross bores including cylinder walls therein along axes normal to each other, said housing having one closed end and a removable cylinder head closing its other end; a drive shaft rotatably mounted in said housing and said cylinder head; an eccentric on said drive shaft, a slider block rotatably mounted on said eccentric; a pair of yokes disposed normal to each other and in engagement with normal surfaces of said slider block; pairs of piston assemblies connected to each yoke so that the pistons extend oppositely from each other from said yokes; said piston assemblies being press-fit connected to said yokes providing a stable connection therebetween; said pistons including a relatively short piston skirt; said pistons further including an annular groove in said piston skirts extending a major portion of the width along said skirt; a sealing ring disposed in said groove substantially the full width thereof to provide a relatively wide bearing surface between said piston skirt and the cylinder walls of said cross bores, the relatively wide bearing surface of said sealing ring being sufficiently wide to accomplish a fluid tight seal while providing substantial area of engagement preventing metal-to-metal contact between said piston skirts and said cylinder walls; said cylinder housing being formed to include relatively large intake and discharge cavities muffling sound energy in gases flowing therethrough during operation of the compressor, said discharge cavities molded integral with said cylinder housing between the cylinder bores; reinforcing web portions molded integral with said cylinder housing and at least partially defining said discharge cavities and providing a rigid cylinder housing structure and areas for fastening the cylinder head to said cylinder housing as well as areas for securing the entire assembly in an operational environment, and valve means to direct fluids to and from the cylinder bores.

2. A radial compressor of the type including a cast cylinder housing having cross bores therein along axes normal to each other; said housing having an integral closed end and an open end; a removable cylinder head assembly closing the open end of said cylinder housing when attached thereto; said cylinder housing being circular in form and terminating in a circumferential opening; a cylindrical sleeve member capable of being disposed about said cylinder housing enclosing the circumferential periphery thereof; a plurality of retaining pins positioned in said cylinder housing retaining said cylindrical sleeve; a first inwardly extending annular flange molded integral with said cylinder housing; a second inwardly extending annular flange molded integral with said cylinder head; main bearing assemblies each disposed in said annular flanges; a drive shaft having bearing portions positioned in alignment with and rotatably supported by said main bearing assemblies; an eccentric on said drive shaft centrally positioned within said cylinder housing; a plurality of elongated roller bearings in circumferential engagement with said eccentric; a slider block rotatably mounted upon said plurality of bearings; a first yoke assembly positioned for reciprocal movement along a first axis in said cylinder housing in a first of said cross bores; a second yoke assembly positioned for reciprocal movement along an axis normal to that of said first yoke in a second of said cross bores in said cylinder housing; said yokes including surfaces in engagement with said slider block for operation thereby as said eccentric rotates with said drive shaft; each of said yoke assemblies containing oppositely extending sockets therein; a piston assembly including a stem portion that is press-fitted within each of said oppositely extending sockets rigidly connecting the piston assemblies to said yokes; a relatively short piston skirt on said piston assemblies containing a relatively wide annular groove therein; a single Teflon sealing ring initially in the form of a flat washer positioned in said groove and being folded to a relatively flat position and being inherently biased outwardly against the cylinder walls of said cross bores; said sealing ring being of substantial width relative to said piston skirt so as to accomplish a fluid tight seal while providing a relatively large bearing surface between said piston skirt and said cylinder walls preventing metal-to-metal contact between the piston and the cylinder; a fluid inlet chamber in the central portions of said cylinder housing defined by the closed ends of said housing and the inner sides of said piston assemblies, said inlet chamber providing sufficient volume to muffle sound energies in the incoming fluids; a pressurized fluid discharge chamber in said cylinder housing extending circumferentially adjacent the outer periphery of said housing and being defined in part by said cylindrical sleeve member and the outer surfaces of said piston assemblies, said fluid discharge chamber including muffler cavities molded integral with said cylinder housing between adjacent cylinder bores; said piston assemblies having apertures therethrough for conveying fluid from said inlet chamber to a compression chamber on the outer sides of said piston assemblies, valve means secured to the outer surface of said piston assembly regulating flow through said apertures; and valve means positioned between said compression chamber and said discharge chamber regulating flow of pressurized fluid from the compression chamber into the discharge chamber as the piston assemblies reciprocate within their respective cross bores.

3. The radial compressor of claim 2 including integral reinforcing portions molded with said cylinder housing providing areas for securing said removable cylinder head assembly thereto and further providing reinforcement areas to said cylinder housing resulting in a rigid assembly; said valve means secured to the outer surface of said piston comprising an annular flexible reed plate regulating flow through a series of circumferentially spaced apertures through said piston assembly; and said valve means regulating flow between the compression chamber and the discharge chamber comprising an annular discharge reed valve plate secured to a rigid plate that is in turn fastened to the cylinder walls of said cross bores, the rigid plate containing a plurality of circumferentially spaced apertures controlled by the discharge reed plate thereby regulating flow into the discharge chamber.

4. The radial compressor of claim 3 wherein the fastening of said rigid plate of the last named valve means comprises a counterbore in the radially outer end of each of said cross bores forming a shoulder seating said rigid plate in said outer end and including a recess, and a snap ring in said recess retaining said rigid plate on said shoulder.

5. The radial compressor of claim 1 wherein said press-fit connection comprises an aluminum stem on each of said piston assemblies and an aluminum socket on its respective yoke, the diameter of said stem before the press-fit connection being larger than the diameter of said socket by substantially 0.0020 inch to 0.0035 inch.

6. The radial compressor of claim 1 wherein said press-fit connection comprises an aluminum stem on each of said piston assemblies and an imperforate aluminum socket on its respective yoke, the diameter of said stem before the press-fit connection being larger than the diameter of said socket, and said stem having a hollow therein to provide a compression chamber to store air trapped between stem and socket after the press-fit connection.

7. A compact, lightweight radial compressor of the type including a cast aluminum cylinder housing having cross bores therein along axes normal to each other; each of said cross bores having a counterbore in the radially outer end thereof forming a shoulder between the bore and counterbore; said housing having an integral closed end and an open end; a removable aluminum cylinder head assembly closing the open end of said cylinder housing when attached thereto; said cylinder housing being circular in form and terminating in a circumferential opening; a cylindrical sleeve member capable of being disposed and retained about said cylinder housing and enclosing the circumferential periphery thereof; a first inwardly extending annular flange molded integral with said cylinder housing; a second inwardly extending annular flange molded integral with said cylinder head; main bearing assemblies each disposed in said annular flanges; a drive shaft having bearing portions positioned in alignment with and rotatably supported by said main bearing assemblies; an eccentric on said drive shaft centrally positioned within said cylinder housing; a plurality of elongated roller bearings in circumferential engagement with said eccentric; a slider block rotatably mounted upon said plurality of bearings; a first yoke assembly positioned for reciprocal movement along a first axis in said cylinder housing in a first of said cross bores; a second yoke assembly positioned for reciprocal movement along an axis normal to that of said first yoke in a second of said cross bores in said cylinder housing; said yokes including surfaces in engagement with said slider block for operation thereby as said eccentric rotates with said drive shaft; each of said yoke assemblies containing oppositely extending aluminum sockets therein; a piston assembly including an aluminum stem portion that is press-fitted within each of said oppositely extending aluminum sockets rigidly connecting the piston assemblies to said yokes; a relatively short piston skirt on said piston assemblies containing a relatively wide annular groove therein; a single Teflon sealing ring positioned in said groove; said sealing ring being of substantial width relative to said piston skirt so as to accomplish a fluid tight seal while providing a relatively large bearing surface between said piston skirt and said cylinder walls preventing metal-to-metal contact between the piston and the cylinder; a fluid inlet chamber in the central portions of said cylinder housing defined by the closed ends of said housing and the inner sides of said piston assemblies, said inlet chamber providing sufficient volume to muffle sound energies in the incoming fluids; a pressurized fluid discharge chamber in said cylinder housing extending circumferentially adjacent the outer periphery of said housing and being defined in part by said cylindrical sleeve member and the outer surfaces of said piston assemblies, said fluid discharge chamber including muffler cavities molded integral with said cylinder housing between adjacent cylinder bores; said piston assemblies having apertures therethrough for conveying fluid from said inlet chamber to a compression chamber on the outer sides of said piston assemblies, suction valve means secured to the outer surface of said piston assembly regulating flow through said apertures; discharge valve means positioned between said compression chamber and said discharge chamber regulating flow of pressurized fluid from the compression chamber into the discharge chamber as the piston assemblies reciprocate within their respective cross bores; said discharge valve means comprising as a riveted unitized assembly a rigid valve plate configured to fit said counterbore and containing a plurality of circumferentially spaced apertures, an annular discharge reed valve overlying said apertures and a retainer plate backing said reed valve to limit the movement of said reed valve when it is regulating said flow of pressurized fluid; and a retainer ring snap fastened into said counterbore to retain said discharge valve means on said shoulder.

8. A compact radial compressor of the type including a cast cylinder housing having cross bores including cylinder walls therein along axes normal to each other, said cylinder housing including relatively large intake and discharge cavities muffling sound energy in gases flowing therethrough during operation of the compressor; said housing having a closed end, an open end opposite said closed end and a removable cylinder head closing its open end; a drive shaft assembly insertable as a unit into said cylinder housing through its open end; said drive shaft assembly including an integral crankshaft journaled in said housing and said cylinder head and having an eccentric, a slider block, needle bearings between said slider block and said eccentric rotatably mounting said slider block on said eccentric, a pair of aluminum yokes disposed normal to each other with inwardly facing normal surfaces in engagement with normal surfaces of said slider block, means for retaining said needle bearings between said slider block and said eccentric and for maintaining front and back surfaces of said slider block out of engagement with said pair of yokes, and a pair of counterweights outboard of said pair of yokes and riveted together through said eccentric to lock said drive shaft assembly into a unit; pairs of piston assemblies including aluminum pistons connected to each yoke so that the pistons extend oppositely from each other from said yokes; said aluminum pistons being press-fit connected to said aluminum yokes providing a stable connection therebetween, said press-fit comprising a socket on one of said yoke or said piston and a stem on the other, an interference dimension of said stem being larger than an interference dimension of said socket; said pistons including a relatively short piston skirt; a sealing ring disposed in hugging relationship around said skirt and being of substantial width relative to the width of said piston skirt to provide a relatively wide bearing surface between said piston skirt and the cylinder walls of said cross bores, said sealing ring being at least partially exposed in said intake cavity upon reciprocation of its respective piston during operation of said compressor, means for retaining said sealing ring in hugging relationship on said skirt during operation of said compressor, the relatively wide bearing surface of said sealing ring being sufficiently wide to accomplish a fluid tight seal while providing substantial area of engagement preventing metal-to-metal contact between said piston skirts and said cylinder walls, the relatively wide bearing surface also facilitating the alignment of said stem with said socket for said press-fit after the drive shaft assembly is inserted as a unit into said cylinder housing; and valve means to direct fluids to and from the cylinder bores.

9. The compact radial compressor of claim 8 wherein said means for retaining said sealing ring is an annular groove in said piston skirt of substantially the same width as said sealing ring therein.

10. The compact radial compressor of claim 9 wherein said annular groove includes vent means beneath said sealing ring for bypassing leakage gases thereat from one side of said piston skirt to the other side thereof to prevent said leakage gases from tending to blow said sealing ring out of said annular groove.

11. The compact radial compressor of claim 10 wherein said vent means are four vent holes equally spaced around the piston skirt joined beneath said sealing means by an additional annular groove in the aforementioned annular groove.

12. The compact radial compressor of claim 8 wherein said means for retaining said needle bearings is hardened steel, said slider block has sockets and said retaining means has extrusions interfitting with said sockets to key said retaining means to said slider block to prevent the edges of said retaining means from gouging said aluminum yokes.

13. A radial compressor of the type including a cast aluminum cylinder housing having cross bores including cylinder walls therein along axes normal to each other, said housing having a closed end, an open end opposite said closed end and a removable cylinder head closing its open end; a shaft assembly insertable into said cylinder housing through its open end and including an integral drive shaft and eccentric rotatably mounted in said housing and said cylinder head, a slider block, needle bearings between said slider block and said eccentric rotatably mounting said slider block on said eccentric, a pair of aluminum yokes disposed normal to each other and in engagement with normal surfaces of said slider block, means for retaining said needle bearings between said slider block and said eccentric and for maintaining front and back surfaces of said slider block out of engagement with said pair of yokes, and a pair of counterweights outboard of said pair of yokes and held together through said eccentric to lock said shaft assembly in assembled relationship; pairs of piston assemblies including aluminum pistons connected to each yoke so that the pistons extend oppositely from each other from said yokes; said aluminum pistons being press-fit connected to said aluminum yokes providing a stable connection therebetween, said press-fit comprising an imperforate socket on said yoke and a stem on said piston having a reduced diameter portion forming a shoulder engaging said yoke, the reduced diameter portion of said stem being larger than the diameter of said socket, said reduced diameter portion of said stem having a hollow therein to provide a compression chamber to store air trapped between said reduced diameter portion and socket as the result of press-fit; said pistons including a relatively short piston skirt, said pistons further including an annular groove in said piston skirts extending a substantial width along said skirt; a sealing ring disposed in said groove substantially the full width thereof to provide a relatively wide bearing surface between said piston skirt and the cylinder walls of said cross bores, the relatively wide bearing surface of said sealing ring being sufficiently wide to accomplish a fluid tight seal while providing substantial area of engagement preventing metal-to-metal contact between said piston skirts and said cylinder walls, the relatively wide bearing surface also facilitating the alignment of said stem with said socket after said shaft assembly is inserted into said cylinder housing; and valve means to direct fluids to and from the cylinder bores.

14. The radial compressor of claim 13 wherein the reduced diameter portion of said stem is larger than the diameter of said socket by substantially 0.0020 inch to 0.0035 inch, and said relatively short piston skirt is substantially 0.380 inch wide and has an outside diameter substantially 1.775 inch to 1.780 inch.

15. A radial compressor of the type including a cast cylinder housing having cross bores including cylinder walls therein along axes normal to each other, said housing having one closed end and a removable cylinder head closing its other end; a drive shaft rotatably mounted in said housing and said cylinder head; an eccentric on said drive shaft, a slider block rotatably mounted on said eccentric; a pair of yokes disposed normal to each other and in engagement with normal surfaces of said slider block; pairs of piston assemblies connected to each yoke so that the pistons extend oppositely from each other from said yokes; said piston assemblies being press-fit connected to said yokes providing a stable connection therebetween; said press-fit connection comprising an aluminum stem on each of said piston assemblies and an imperforate aluminum socket on its respective yoke, the diameter of said stem before the press-fit connection being larger than the diameter of said socket, and one of said stem or said socket having a hollow therein to provide a relief chamber for air trapped between stem and socket after the press-fit connection; said pistons including a relatively short piston skirt; said pistons further including an annular groove in said piston skirts extending a substantial width along said skirt; and a sealing ring disposed in said groove providing a relatively wide bearing surface between said piston skirt and the cylinder walls of said cross bores, the relatively wide bearing surface of said sealing ring preventing metal-to-metal contact between said piston skirts and said cylinder walls; said cylinder housing being formed to include relatively large intake and discharge cavities muffling sound energy in gases flowing therethrough during operation of the compressor.

16. An improved method of assembling a radial compressor without screws comprising the steps of inserting a unitized drive shaft assembly including yoke sockets into the central intake chamber of a radially bored and counterbored drum-shaped cylinder housing, press-fitting stems of unitized piston assemblies including intake valves through the radial bores into stable connections with the yoke sockets of said drive shaft assembly, snap-fastening unitized discharge valve assemblies into seated relationship in said counterbores radially outboard of said piston assemblies, and pressing a sleeve into surrounding relationship with said cylinder housing outboard of said discharge valve assemblies to form a discharge chamber around said cylinder housing.

17. An improved method of partially assembling a radial four cylinder compressor to eliminate screws from moving aluminum parts including the steps of inserting a unitized drive shaft assembly including four aluminum yoke sockets through an open end of a radially bored one-piece casting to a journaled position in a closed end of the casting, aligning a pair of said yoke sockets with a pair of radial cylinder bores 90° apart in the casting and simultaneously press-fitting a pair of aluminum pistons into said pair of yoke sockets through said cylinder bores 90° apart in the casting.

* * * * *